United States Patent [19]

Torres et al.

[11] Patent Number: 4,995,413
[45] Date of Patent: Feb. 26, 1991

[54] COKE DRUM INLET LINE ALIGNMENT DEVICE

[75] Inventors: Daniel L. Torres, Bellingham; Darryl C. Gullikson, Custer; M. Bruce Case; Ralph A. Neher, both of Bellingham, all of Wash.

[73] Assignee: Atlantic Richfield Company, Los Angeles, Calif.

[21] Appl. No.: 451,401

[22] Filed: Dec. 15, 1989

[51] Int. Cl.⁵ .............................................. B65G 67/00
[52] U.S. Cl. ...................................... 137/1; 137/615; 141/387; 196/135
[58] Field of Search ............... 141/279, 387, 388, 1; 137/615, 1; 196/135; 202/262; 222/74, 538

[56] References Cited

U.S. PATENT DOCUMENTS

| | | | |
|---|---|---|---|
| 1,552,433 | 9/1925 | Hills | 196/135 |
| 3,705,610 | 12/1972 | Baudras | 137/615 |
| 4,844,133 | 7/1989 | von Meyernick et al. | 141/387 |
| 4,881,581 | 11/1989 | Hollerback | 141/113 |

*Primary Examiner*—A. Michael Chambers
*Attorney, Agent, or Firm*—John P. Spitals

[57] ABSTRACT

Movement of a coke drum feed line relative to the feed inlet using apparatus comprising a plurality of means for moving the feed line in generally mutually orthogonal directions. One end of each moving means is pivotally attached to a support means by spherical bearings, while the other end is in direct or indirect engagement with the feed line. In a preferred embodiment, the feed line is supported by a bracket which extends generally longitudinally along the exterior surface and to which the moving means are attached. Suitably, the moving means comprises hydraulic or pneumatic cylinders provided with shafts extending axially from one end of the cylinders, whereby movement of the shaft is effected by introducing fluid into the cylinder so as to move a piston associated with the shaft.

14 Claims, 2 Drawing Sheets

COKE DRUM INLET LINE ALIGNMENT DEVICE

BACKGROUND OF THE INVENTION

This invention relates to apparatus for use in preparation of coke from crude petroleum products.

A "delay coker" is an apparatus for the preparation of coke from the heaviest portion of crude oil (commonly referred to as "bunker" fuel). The crude is generally heated to a temperature of about 800°–900° C. and then fed into the bottom of a coke drum. The coke drum has a diameter on the order of 25 feet and may be 80–90 feet high. At an elevated pressure (e.g., 30 pounds or more), the heated crude is thermally decomposed to leave a coke residue. During the thermal decomposition, lighter products such as hydrocarbons gases, gasoline and jet fuel, are recovered from the top of the coke drum. The decomposition process takes on the order of 16–20 hours to complete.

The solid residue is treated with steam to remove any entrained volatile hydrocarbons. The residue is then cooled down with water. Finally, the coke drum is opened at both the top and the bottom, and the solid product is drilled out for recovery. A typical drilling procedure employs a high pressure water drill (for example, using 3000 lb/in$^2$ pressure).

The heavy crude which is treated in the coke drum is supplied to the drum by means of a feed line. This line from the crude source is directly connected to a feed inlet, usually in the bottom lid of the coke drum. Generally, both the feed line and the feed inlet terminate in flanges; the respective flanges are designed to achieve a mutual engagement when the feed line and feed inlet are brought into contact.

When it is desired to open both ends of the coke drum in order to remove the accumulated coke, it is generally first necessary to disconnect the feed line from the feed inlet. As the feed line is a conduit of fairly significant diameter (at least 10") and may have a significant length, manual connection and disconnection of the feed line with the feed inlet is a burdensome task. Moreover, because the coke drum is still at a fairly elevated temperature at the time the line is to be disconnected, operator contact with the apparatus is not desirable. The feed line is also at an elevated temperature, due to the presence of the heated crude therein. Further, even after steam treatment there may be hydrocarbon vapors released when the feed line is disconnected from the feed inlet. It would be preferable if the likelihood of operator exposure to such hydrocarbon vapors and/or steam were reduced or eliminated.

Accordingly, it is an object of the present invention to provide methods and apparatus for moving a feed line relative to an associated feed inlet, whereby direct operator contact with the apparatus is minimized and physical effort is reduced.

SUMMARY OF THE INVENTION

In accordance with the present invention, movement of the feed line relative to the feed inlet is achieved through the use of apparatus comprising a plurality of means for moving the feed line each in a given direction, in combination with support means. Preferably, three moving means are provided for movement of the feed line in generally mutually orthogonal directions. One end of each moving means is pivotally attached to the support means by spherical bearings, while the other end is in direct or indirect engagement with the feed line. In a preferred embodiment, the feed line is supported by a bracket which extends generally longitudinally along the exterior surface and to which the moving means are attached. Suitably, the moving means comprises hydraulic or pneumatic cylinders provided with shafts extending axially from one end of the cylinders, whereby movement of the shaft is effected by introducing fluid into the cylinder so as to move a piston associated with the shaft.

DETAILED DESCRIPTION OF THE INVENTION

Figure 1:
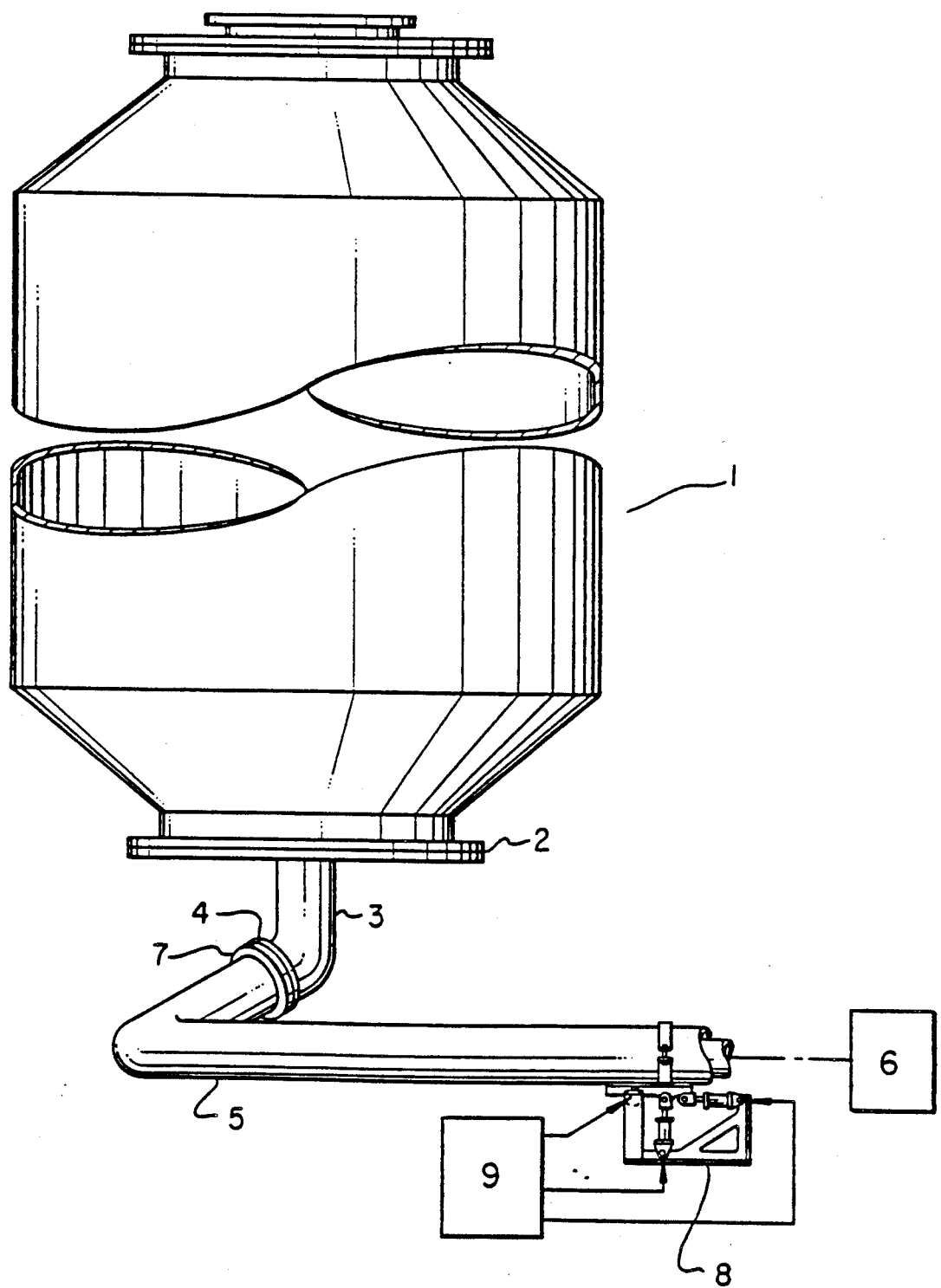
FIG. 1 illustrates an embodiment of the apparatus of the invention in schematic form, in conjunction with a corresponding coke drum and feed inlet.

Referring to FIG. 1, a coke drum 1 is provided with a bottom lid 2, to which is integrally attached a feed inlet 3. The feed inlet 3 terminates in a flange 4. The feed line 5 is connected to a feed source 6 (for example, a coker heater). The feed line 5 also terminates in a flange 7, designed so as to be engageable with the flange 4 of the feed inlet 3. In the illustrated embodiment, both the feed inlet 3 and the feed line 5 are provided with an elbow bend in the vicinity of the flanges 4 and 7, respectively. Other suitable geometries are of course equally within the scope of the present invention. Further, any number of different reciprocal flange arrangements as are known in the art may be used to provide a suitable combination. The principal requirement of any such flange combination is that a liquid-tight seal be made when the flange 7 is brought into engagement with the flange 4, so as to permit introduction of liquid from the feed source 6 into the coke drum 1 without leakage.

A feed line moving means 8 is associated with the feed line 5 at a suitable location upstream of the flange 7. One consideration with respect to locating the feed line moving means 8 is the provision of adequate support for the feed line 5 throughout movement of the line in and out of engagement with the feed inlet 3. In view of the substantial weight of the feed line 5 and the heated liquid therein, the feed line moving means 8 is suitably fixed in location relative to the coke drum 1 and mounted securely on the ground (for example, by embedding it in concrete). Operation of the feed line movement means 8 is controlled by a suitable control means 9, illustrated only schematically in FIG. 1.

Figure 2:
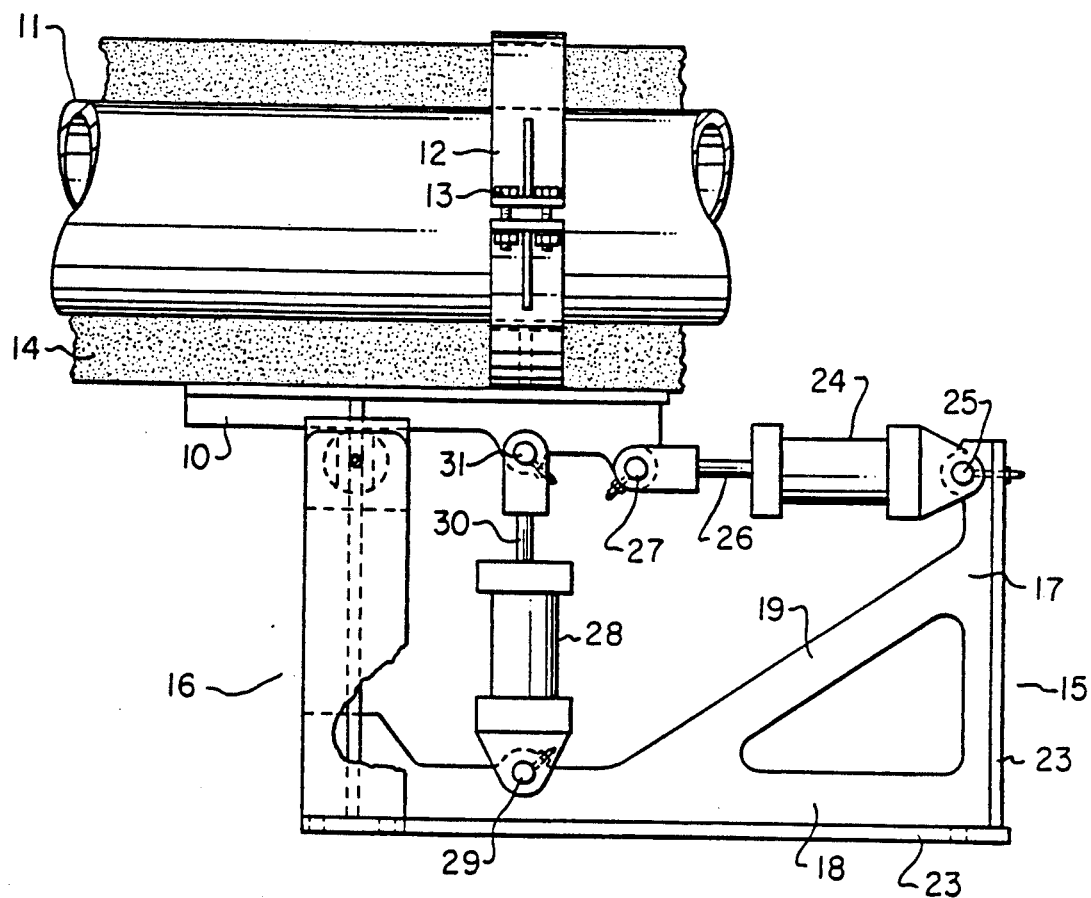
FIG. 2 is a side-view perspective of the embodiment of FIG. 1.

FIG. 2 illustrates the feed line movement means 8 in a side-view perspective, in association with the feed line 5. The feed line 5 is provided in this embodiment with a bracket 10 generally extending along a portion of the length thereof. The bracket 10 further extends radially through a portion of the feed line 5 to provide direct support for an internal feed pipe 11, which is located generally concentrically within the feed line 5. The bracket 10 may be further secured to the exterior surface of the feed line 5 by means of a collar 12, which is provided with a securing means 13 (for example, bolts in the illustrated embodiment). The internal feed pipe 11 is generally surrounded by insulation material 14 in the space between the external surface of the feed pipe 11 and the internal surface of the feed line 5.

The feed line movement means 8 in the embodiment illustrated includes a first support element 15 and a second support element 16. As illustrated in FIG. 2, the first support element 15 comprises a vertical support member 17 and a horizontal support member 18 joined together at a first end thereof to the lower end of the vertical support member 17 so that the members are generally perpendicular. A cross-beam member 19 is provided for additional support. The horizontal support member 18 is suitably secured to the ground (for example, by embedding in concrete and/or through the use of bolts). The horizontal support member 18 generally runs in a direction substantially parallel to the direction in which the feed line 5 extends, whereas the vertical support member 17 is substantially perpendicular to the feed line 5. Similarly, the second support element 16 (illustrated in FIG. 3) comprises a vertical support member 20 joined at its lower end to a first end of a horizontal support member 21, which is suitably secured to the ground; in the embodiment illustrated, a cross-bar 22 is similarly provided between the support members. The horizontal support members 18 and 21 lie substantially in the same plane and are joined together at their respective second ends in a generally perpendicular manner, such that the support member 21 runs in a direction substantially perpendicular to that of the feed line 5. The support members may suitably comprise iron or steel plates or bars having a width on the order of from about 2 to about 6 inches and a thickness on the order of from about $\frac{3}{4}''$ to about 2''. The individual support members may be welded together to form the support elements; alternatively, the three support members comprising each support element may be formed as a unitary component, having (in the illustrated embodiment) essentially a triangular shape. For additional strength, the external (i.e., horizontal and vertical) members of the first and second support elements are preferably supported by a frame structure 23; this frame structure 23 may suitably comprise iron or steel plates or bars of similar composition and construction to the individual support members. In a preferred embodiment, the frame structure 23 comprises an essentially L-shaped arrangement of plates or bars; the support members are joined to the internal surface of the frame structure in an essentially perpendicular manner. If desired, the frame structure 23 may also be formed as part of a unitary component with the respective support members; alternatively, depending on design, the frame structure 23 may be dispensed with altogether.

As illustrated in FIG. 2, a first moving means 24 (in the illustrated embodiment, in the form of a hydraulic cylinder) is connected at one end by a pivot means 25 (suitably, in the form of a spherical bearing) to the vertical support member 17 of the first support element 15. The opposite end of the first moving means 24 is provided with a shaft 26 which extends axially therefrom and connected at its far end to the bracket 10 by a pivot means 27. In an analogous manner, a second moving means 28 is connected to the horizontal support member 18 of the first support element 15 by pivot means 29, and to bracket 10 via a shaft 30 by a pivot means 31. Finally, as illustrated in FIG. 3, a third moving means 32 is connected to the vertical support member 20 of the second support element 16 by a pivot means 33, and to the bracket 10 via a shaft 34 by a pivot means 35.

Figure 3:
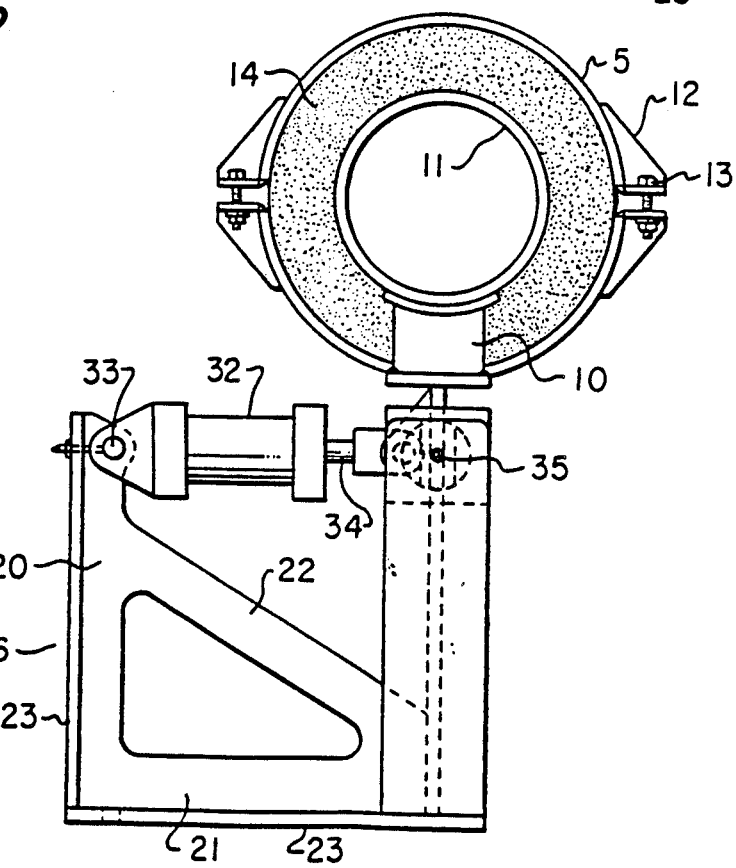
FIG. 3 is an end-view perspective of the embodiment of FIG. 1.

As is apparent from FIGS. 2 and 3, the three moving means are arranged such that a single moving means is primarily associated with movement in each of the three mutually orthogonal directions x, y and z. Movement of the bracket 10 (and the feed line 5 associated therewith) from an initial position with coordinates x0, y0, z0 to a final position with coordinates x1, y1, z1 may be effected in a relatively straightforward manner by sequentially actuating each of the three moving means to effect the desired movement in each of the three respective directions. Thus, the first moving means 24 may make the necessary adjustment in the x direction, followed by the second moving means 28 to move in the y direction and the third moving means 32 to move in the z direction.

To enable such a sequential movement of the bracket 10 and associated feed line 5 in mutually orthogonal directions, it is essential that the pivot means provide sufficient freedom of movement that the two moving means not actuated at any given moment may be adjusted from a strict directional alignment to compensate for dislocations associated with the displacement of the bracket 10 from its initial coordinates. In a preferred embodiment, this freedom of movement is achieved by using as pivot means spherical bearings, which may be mounted so as to permit free rotation in the two directions orthogonal to that of the associated moving means. Upon completion of adjustments in each of the x, y and z directions (for example, by appropriate extension or retraction of the respective shafts of the cylinders), the three moving means will all have been displaced from a strict directional alignment by compensatory rotations of the pivot means at each end thereof; a reversal of the adjustments to return the bracket 10 to its original position would in principle return the moving means to their original alignments in the x, y and z directions. In operation, however, there may be significant expansion and contraction of the feed line 5, even to the extent that the three moving means generally do not return to a strict directional alignment. In view of the construction and arrangement of the apparatus, however, each moving means will continue to effect movement substantially in a single direction.

To ensure smooth and accurately controlled movement, it is generally preferred that the moving means comprise hydraulic or pneumatic cylinders of appropriate size and strength to effect the necessary support and movement of the feed line 5. Hydraulic cylinders are preferred. In general, the amount of displacement of the feed line 5 needed to permit removal of the bottom cover 2 of the coke drum 1 is minimal. Accordingly, it has been found that appropriately-sized cylinders having a stroke on the order of 4 to 6 inches are sufficient for the movement of the feed line 5 necessary for removal of the bottom lid 2 and connection of the feed line 5 to the feed inlet 3.

In view of the relative complexity which would be involved in arranging the lines normally associated with hydraulic cylinders at some distance therefrom, it has been found expedient to maintain the control means for the three moving means substantially adjacent to the support structure. In accordance with a preferred embodiment of the invention, however, second control means is provided for actuation of one of the moving means at a significant distance (e.g., 5–20 feet) from the support structure. In this embodiment, it is possible for the operator to disconnect the feed line 5 from the feed inlet 3 by moving the bracket 10 (and associated feed line 5) in a first direction while the operator is at a location remote from the feed line; after a suitable interval, for example to permit escape of vapors or cooling of the line, movement in the remaining directions to permit removal of the bottom lid 2 may be effected.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A method for moving a first line having a first end flange to a second line having a second end flange, wherein said first line is movable in mutually orthogonal x, y and z directions and said second line is substantially immovable, said method comprising:
    actuating means for moving said first line in a first of said x, y and z directions so as to decrease distance between said first end flange and said second end flange in said first direction;
    actuating means for moving said first line in a second of said x, y and z directions so as to decrease distance between said first end flange and said second end flange in said second direction; and
    actuating means for moving said first line in a third of said x, y and z directions so as to decrease distance between said first end flange and said second end flange in said third direction.

2. A method according to claim 1, wherein said actuating steps comprise introducing fluid into a hydraulic cylinder so as to move a piston sealing said cylinder at one end thereof.

3. A method according to claim 1, wherein at least one of said actuating steps is effected at a location remote from said first line.

4. Apparatus for connecting a first line to a second line, comprising:
    a support structure for said first line; and
    first, second and third moving means for moving said first line relative to said support structure, each of said moving means being pivotally attached at a first end thereof to said first line and at a second, opposite end thereof to said support structure, each of said moving means further being oriented with respect to each other moving means for movement of said first line in generally mutually orthogonal directions.

5. Apparatus according to claim 4, wherein each of said moving means comprises a hydraulic cylinder attached at one end thereof to said support structure; a shaft extending axially from a second, opposite end of the cylinder and attached at an end thereof opposite said cylinder to said first line; and a fluid source attached to said cylinder for actuating said shaft.

6. Apparatus according to claim 5, further comprising a bracket extending generally longitudinally along an exterior surface of said first line, wherein each of said shafts is pivotally attached to said bracket.

7. Apparatus according to claim 4, wherein said moving means are pivotally attached to said first line and said support structure by spherical bearings.

8. Apparatus according to claim 4, wherein said support structure comprises a first support element and a second support element, each of said support elements comprising a vertical support member and a horizontal support member joined at a first end thereof to a lower end of said vertical support member in a generally perpendicular manner, and said respective horizontal support members of said first and second support elements being joined together at their respective second ends in a generally perpendicular manner.

9. Apparatus according to claim 8, wherein said horizontal support member of said first support element runs substantially parallel to said first line and said horizontal support member of said second support element runs substantially perpendicular to said first line.

10. Apparatus according to claim 8, wherein each of said support elements further comprises a crossbeam member connecting an upper end of a respective vertical support member and said corresponding horizontal support member at or near said second end thereof.

11. Apparatus according to claim 8, wherein said support structure further comprises a support frame.

12. Apparatus according to claim 8, wherein said first moving means is pivotally attached to said vertical support member of said first support element, said second moving means is pivotally attached to said horizontal support member of said first support element, and said third moving means is pivotally attached to said vertical support member of said second support element.

13. Apparatus according to claim 4, wherein said first line and said second line each terminate in an end flange, the end flange of said first line being adapted to match the end flange of said second line.

14. Apparatus according to claim 4, wherein at least one of said first, second and third moving means is adapted for control at a location remote from said support structure.

* * * * *